Feb. 27, 1951     F. F. ROLL ET AL     2,543,064
PARACHUTE PACKING TOOL
Filed Sept. 14, 1945
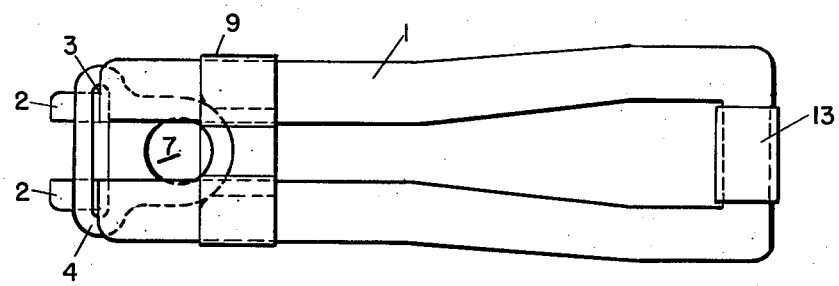
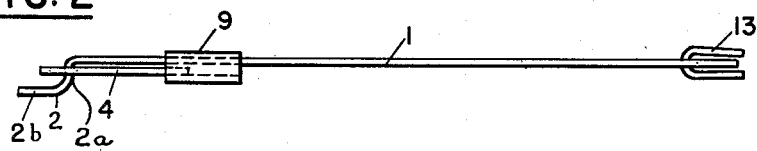
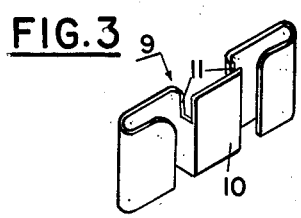
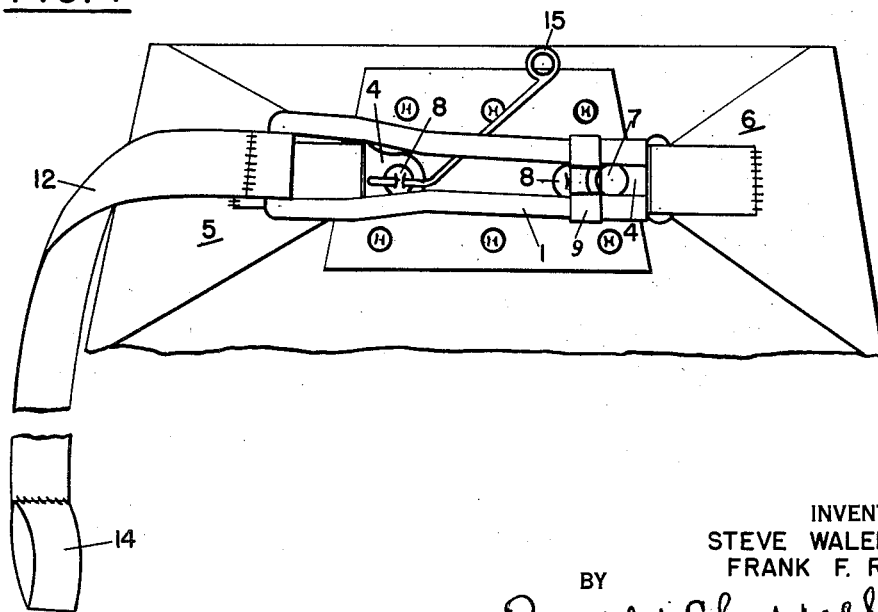
INVENTOR
STEVE WALEK, JR
FRANK F. ROLL
BY Ralph L. Chappell
ATTORNEY Patented Feb. 27, 1951

2,543,064

UNITED STATES PATENT OFFICE 2,543,064

PARACHUTE PACKING TOOL

Frank F. Roll and Steve Walek, Jr.,
Alameda, Calif.

Application September 14, 1945, Serial No. 616,431

3 Claims. (Cl. 81—3)

(Granted under the act of March 3, 1883, as amended April 30, 1928; 370 O. G. 757)

This invention relates to a parachute packing tool, and more particularly, to a tool of this character which is useful in bringing the end flaps of a parachute pack into locking position.

In packing parachutes, considerable difficulty is experienced in pulling the end flaps of the parachute pack into position so that they can be secured to the locking cones provided for the purpose. Since the pack is very tight at this, the final, stage in the packing operation, the securing of the end flaps becomes a serious problem, particularly for a female rigger of normal physique.

It is accordingly an object of this invention to provide a simple tool which will make it easier for a parachute rigger to pull the end flaps of a parachute pack into locking position.

Other and related objects of this invention will appear from the nature of the following description, the accompanying drawing, and the appended claims.

We have discovered that the foregoing objects may be accomplished by a tool, described below, which is fastened to the element which forms the tip of the end flap of the parachute pack, and which permits the rigger to employ the full weight of his body to pull the flap into place.

It is believed that the nature of this tool may be best understood from a consideration of the drawing which accompanies this specification, wherein:

Fig. 1 is a plan view showing the tool before it is fastened to an end flap of the parachute pack;

Fig. 2 is a side view showing the tool fastened to one of the said end flaps;

Fig. 3 is a view in perspective of the sliding element used to lock the tool to the end of one of the said end flaps; and Fig. 4 is a view, in perspective, to a reduced scale, showing the manner in which the tool is used with a parachute pack.

Referring more in detail to the drawing:

The substantially U-shaped frame of the tool is indicated at 1. As indicated in Fig. 2, the major portion of the frame may be said to lie generally in one plane. The end of each of the upstanding legs of the U-shaped frame member 1 is formed into a prong element generally indicated by the numeral 2. Each prong element 2 includes a portion 2a (Fig. 2) transverse to the general plane of the frame member and a terminal portion 2b offset from but substantially parallel to the general plane of frame member. The two prong elements together constitute the prong portion of the frame member 1. The prongs 2 engage a slot 3 in the element 4 which forms the tip of each of the end flaps of the parachute pack. The end flaps of the pack are shown at 5 and 6 in Fig. 4. A hole 7 in each of the elements 4 allows engagement of one of the locking cones 8 on the parachute pack, as shown in Fig. 4, when the end flap has been drawn into the proper position.

A slide member 9, shown in detail in Fig. 3, is slidably mounted on the frame 1. After the prong elements 2 have engaged the slot 3, this sliding member 9 is moved into position so that the portion 10 thereof comes to rest under the element 4 as shown Fig. 2. Once the member 9 is so positioned, it serves to lock the tool to the particular end flap with which it is then engaged. Notches 11, shown in Fig. 3, are provided in the member 9 in order that the said portion 10 may be slid into position under the element 4 to effect the locking engagement.

A strap 12, shown in Fig. 4, is permanently fixed to the base of the U-shaped frame member 1, a sleeve member 13 being preferably employed, as shown in Figs. 1 and 2, to protect the strap from being cut by the frame when the tool is in use. This strap is normally of sufficient length to hang over the edge of the table on which the parachute is being packed, and the hanging end of the strap is provided with a loop, indicated at 14 in Fig. 4, into which the parachute rigger places a foot. By then standing in the loop, while holding the pack in place on the table, the body weight of the operator is brought to bear against the end flap with which the tool member is engaged, and the flap is thereby readily brought into position over the locking cone to which it is to be secured. During this operation the force is transmitted from the member 1 to the element 4 by virtue of the fact that the rightmost surface, as viewed in Fig. 2, of the transverse prong portion 2a bears against the rightmost side of the slot 3. Once the end flap is fastened to the cone by means of a suitable pin, one of which is shown at 15 in Fig. 4, the sliding member 9 is withdrawn and the prong ends 2 of frame 1 are pulled out of slot 3, thereby disengaging the tool from the end flap.

The operation outlined above is then repeated for the other end flap of the parachute pack.

By using the tool described above, the operation of packing a parachute has been greatly facilitated, and by its use, even female operators having a small physique can readily bring the end flaps of the parachute pack into the desired locking position.

While we have shown but one embodiment of our invention it is susceptible to modification without departing from the spirit of the invention. We do not wish, therefore, to be limited by the disclosures set forth, but only by the scope of the appended claims.

The invention described herein may be manufactured and used by or for the Government of the United States of America for governmental purposes without the payment of any royalties thereon or therefor.

We claim:

1. A parachute packing tool comprising a substantially U-shaped frame member, the major portion of which lies generally in one plane, each free end of the legs of said frame member being formed to present a portion extending transverse to said plane and a terminal portion adjoined to said transverse portion and lying in a plane offset from but substantially parallel to said first mentioned plane, the free ends of said legs being adapted for engagement with a fitting on a parachute flap; a locking element mounted on said frame and slidable therein to a portion adjacent said ends for engagement with said fitting to lock said ends of said frame legs against unintentional disengagement from said fitting; and a strap attached to the base of said frame member.

2. A parachute packing tool comprising a frame member incorporating a prong portion adapted to engage a parachute end flap, a locking element slidable on said frame member to a position adjacent said prong portion and having an offset intermediate portion and notches adjacent said intermediate portion for engagement with the end flap when said element is adjacent the prong portion to lock said tool against unintentional disengagement from said flap, and a strap attached to said frame member.

3. A device of the character described comprising a frame member having a prong portion engageable with a fitting on an end flap of a parachute pack, the fitting having a fastening device to be engaged with a cooperative fastening device on the pack, means having notches and an intermediate offset portion for locking said frame member relative to said fitting to prevent unintentional disengagement of said prong portion therefrom, said means being movable to a position adjacent said prong portion, and means for facilitating moving said frame member and fitting to effect engagement of said fastening devices comprising a strap on the frame member having a loop adapted to receive the foot and support the weight of an operator whereby the operator can use his weight to aid in securing the end flaps to a parachute pack.

FRANK F. ROLL.
STEVE WALEK, Jr.

REFERENCES CITED

The following references are of record in the file of this patent:

UNITED STATES PATENTS

| Number | Name | Date |
| --- | --- | --- |
| 811,293 | Hill | Jan. 30, 1906 |
| 1,076,839 | Peter | Oct. 28, 1913 |
| 1,429,852 | Dyer et al. | Sept. 19, 1922 |
| 1,520,716 | Hudd | Dec. 30, 1924 |
| 1,837,899 | Daugy | Dec. 22, 1931 |
| 1,888,269 | Herst | Nov. 22, 1932 |
| 1,963,632 | Smith | June 19, 1934 |
| 1,992,275 | Zettler | Feb. 26, 1935 |
| 2,257,657 | Spahr | Sept. 30, 1941 |